US005586854A

United States Patent [19]

Sakai et al.

[11] Patent Number: 5,586,854

[45] Date of Patent: Dec. 24, 1996

[54] CONNECTOR FASTENING NUT AND BOLT-NUT FASTENED CONNECTOR

[75] Inventors: Hitoshi Sakai; Kazuto Ohtaka, both of Shizuoka-ken, Japan

[73] Assignee: Yazaki Corporation, Tokyo, Japan

[21] Appl. No.: 516,407

[22] Filed: Aug. 17, 1995

[30] Foreign Application Priority Data

Aug. 19, 1994 [JP] Japan .................................... 6-195226

[51] Int. Cl.[6] ............................ F16B 37/14; F16B 39/34

[52] U.S. Cl. ............................ 411/429; 411/302; 411/324

[58] Field of Search .................................... 411/301, 302, 411/276, 291, 324, 427, 429, 917

[56] References Cited

U.S. PATENT DOCUMENTS 3,457,824 7/1969 Derby ...................................... 411/429
5,078,562 1/1992 DeHaitre ................................ 411/302
5,498,111 3/1996 Inaba ...................................... 411/429

FOREIGN PATENT DOCUMENTS 63-13283 1/1988 Japan .
4-21252 5/1992 Japan .
1195081 11/1985 U.S.S.R. ............................... 411/429

*Primary Examiner*—Neil R. Wilson
*Attorney, Agent, or Firm*—Finnegan, Henderson, Farabow, Garrett & Dunner, L.L.P.

[57] ABSTRACT

A connector fastening nut for a bolt-nut fastened connector comprises: a nut member (A, B, C, D) fixed to a first connector housing (M) and formed with a female threaded portion (1) engaged with a male threaded portion (5) of a fastening bolt (4) fitted to a second connector housing (F); and an elastic portion (3*c*, 7*c*, 8*c*, 10*a*) formed integral with the nut member, for urging an end of the fastening bolt in an engagement direction between the female threaded portion of the nut member and the male threaded portion of the fastening bolt, when the male threaded portion has been passed through the female threaded portion after full engagement of the two connector housings (M, F) by fastening the fastening bolt to the fastening nut. The connector fastening nut can engage/disengage the two connector housings smoothly, while preventing the damage of the threaded portions thereof and improving the water-tightness of the fastening nut.

6 Claims, 6 Drawing Sheets

CONNECTOR FASTENING NUT AND BOLT-NUT FASTENED CONNECTOR

BACKGROUND OF THE INVENTION

1. Technical Field

The present invention relates to a connector fastening nut and a bolt-nut fastened connector using the same connector fastening nut. The connector fastening nut is fixed to one of two housings and a connector fastening bolt is fixed to the other of the housings so that the two electric connector housings can be engaged with or disengaged from each other more smoothly by use of the connector fastening bolt and nut.

2. Description of the Related Art

With the advance of the diversification of various electric and electronic appliances mounted on an automotive vehicle, recently the number of poles and thereby the size of the connector to be jointed with wire harness have increased more and more. When the size of the connector increases, since a relatively large connector engaging/disengaging force is inevitably required, a connector whose housings arc engaged with or disengaged from each other by use of a pair of bolt and nut has been proposed. In this bolt-nut fastened connector, a tool (bolt and nut) is previously fixed or mounted on the connector housings. In this bolt-nut fastened connector, however, since an excessive fastening force is easily applied to the two connector housings during engagement thereof, there exists a problem in that the connector housings are easily damaged or broken. Therefore, it is necessary to provide a mechanism for preventing an excessive fastening force from being applied to the two connector housings.

Japanese Published Unexamined (Kokai) Patent Application No. 63-13283 discloses a first example of prior art bolt-nut fastened connector provided with a mechanism for preventing an excessive housing fastening force from being applied to the connector housings. In this prior art example, a fastening bolt having a male threaded portion near an end thereof is rotatably fitted to one of two mated connector housings, and a fastening nut having a female threaded portion is fixed to the other of the two connector housings. When the two connector housings have been full engaged, since the male threaded portion of the fastening bolt is disengaged away from (passed through) the female threaded portion of the fastening nut and thereby the fastening bolt is rotated idle, it is possible to prevent the two connector housings from being fastened excessively. In this first prior art example, however, since an elastic spring is provided to always urge the fastening bolt outward so that the male threaded portion of the fastening bolt can be easily engaged with the female threaded portion the fastening nut when the two connector housings are required to be disengaged from each other. Therefore, there exists a problem in that when the fastening bolt is kept rotated even after the male threaded portion of the fastening bolt has passed through the female threaded portion of the fastening nut, the female threaded portion of the fastening nut is damaged due to a large frictional force between the two threaded portions of the bolt and the fastening nut.

To overcome this problem, Japanese Published Unexamined (Kokai) Utility Model Application No. 4-21252 discloses a second example of prior art bolt-nut fastened connector provided with a mechanism which can prevent an excessive fastening force from being applied to the two connector housings. In this second prior art example, an elastic spring is provided fixed to the connector housing just under the fastening nut in such a way that only after the male threaded portion of the fastening bolt has passed through the fastening nut, the fastening nut is urged outward by the elastic spring to facilitate the engagement of the two threaded portions of the fastening bolt and the fastening nut when the two connector housings are required to be disengaged from each other. In this case, however, although the female threaded portion of the fastening nut can be prevented from being damaged, since a resin spring holder having the elastic spring must be additionally fixed to the connector housing, an additional part is required, so that the manufacturing cost increases and further the assembly work is rather complicated.

Further, a fastening nut is usually insertion-molded together with the connector housing. In this case, it is necessary to form a locating hole in the connector housing to determine the position of the insertion-molded fastening nut. However, when the fastening nut is directly insertion-molded together with the connector housing, there exists such a problem that chips attached on the fastening nut remains within the connector housing, with the result that the conduction trouble may occur between the connector terminals of the mated connector housings. In addition, since there exists another problem in that since the treated surface of the threaded portion of the fastening nut is peeled off due to the thread engagement, the threaded portion is easily rusted. To overcome this problem, a water-tight structure is usually adopted. For this purpose, an additional cap member must be fitted into the insertion-molding hole of the connector housing to seal the hole water-tightly. As a result, there arises another problem in that the number of parts and thereby the cost of the bolt-nut fastened connector increase and further the productivity is lowered in the assembly process.

SUMMARY OF THE INVENTION

With these problems in mind, therefore, it is the object of the present invention to provide a connector fastening nut which can prevent the threads of the fastening bolt and nut from being damaged after the two connector housings have been full engaged, and further can seal the gap between the fastening nut and the connector housing hole under excellent water-tight condition.

Further, the other object of the present invention is to provide an bolt-nut fastened connector using the same connector fastening nut.

To achieve the above-mentioned object, the present invention provides a connector fastening nut for a bolt-nut fastened connector, comprising: a nut member (A, B, C, D) fixed to a first connector housing (M) and formed with a female threaded portion (1) engaged with a male threaded portion (5) of a fastening bolt (4) fitted to a second connector housing (F); and an elastic portion (3*c*, 7*c*, 8*c*, 10*a*) formed integral with said nut member, for urging an end of the fastening bolt in an engagement direction between the female threaded portion of said nut member and the male threaded portion of the fastening bolt, when the male threaded portion has been passed through the female threaded portion after full engagement of the two connector housings (M, F) by fastening the fastening bolt to the fastening nut.

Further, it is preferable that said nut member is a box-shaped nut (A); and said elastic portion (3*c*) is formed in a bottom surface (3*a*) of the box-shaped nut (A) formed integral with the female threaded portion (1) of said nut member (A). Here, said elastic portion (3*c*) is preferably bent inwardly in the bottom portion (3*a*) of said box-shaped nut to provide an inward projecting elastic portion. Further, the wall thickness of said elastic portion (3*c*) is preferably formed thin, as compared with that of other wall portions of the box-shaped nut (A).

Further, it is preferable that said nut member is a box-shaped nut (B); and said elastic portion (7*c*) is formed in a side surface portion (7*b*) of the box-shaped nut (B) formed integral with the female threaded portion (1) of said nut member (B). Here, the side surface portion (7*c*) is preferably bent inwardly in the side portion (7*b*) of said box-shaped nut to provide an inward projecting elastic portion. Further, wall thickness of the side surface portion (7*c*) is preferably formed thin, as compared with other wall portions of the box-shaped nut (B).

Further, it is preferable that said nut member is a box-shaped nut (C); and said elastic portion (8*c*) is at least one hook-shaped cut-out elastic portions (8*c*) formed in a side surface (8*b*) of the box-shaped nut (C) formed integral with the female threaded portion (1) of said nut member (C).

Further, it is preferable that said nut member is an annular plate member (9); and said elastic portion (10*a*) is preferably a U-shaped bolt urging member (10*a*) fixed to an outer circumference of the annular plate member (9) at two opposing sides thereof by welding. Further, the bottom portion of said U-shaped bolt urging portion (10*a*) is preferably bent inwardly in the bottom portion thereof to provide an inward projecting elastic portion.

Further, the present invention provides a bolt-nut fastened connector, comprising: a first connector housing (F) having a connector fastening bolt (4); and a second connector housing (M) having a connector fastening nut (A, B, C, D) engaged with the connector fastening bolt, to connect said first and second connector housings, the connector fastening nut including: a nut member (A, B, C, D) formed with a female threaded portion (1) engaged with a male threaded portion (5) of the fastening bolt (4), and an elastic portion (3*c*, 7*c*, 8*c*, 10*a*) formed integral with said nut member, for urging an end of the fastening bolt in an engagement direction between the female threaded portion of said nut member and the male threaded portion of the fastening bolt, when the male threaded portion has passed through the female threaded portion after full engagement of the two connector housings (M, F) by fastening the fastening bolt to the fastening nut.

In the connector fastening nut according to the present invention, since the fastening nut is provided with the elastic portion or member for urging the male threaded portion of the fastening bolt into engagement with the female threaded portion of the fastening nut, after the male threaded portion of the fastening bolt has been passed through the female threaded portion of the fastening nut, the two engaged connector housings can be immediately disengaged from each other.

In this case, since the nut itself is used as the fastening bolt urging means without use of another additional bolt urging parts or element; that is, since the fastening bolt can be urged by the fastening nut itself, it is possible to reduce the number of the parts and thereby the cost of the fastening nut, while improving the assembly workability in the mass production line.

Further, since the box-shaped fastening nut is used, the nut hole formed in the connector housing can be sealed water-tightly when the connector fastening nut according to the present invention is insertion-molded together with the connector housing. In other words, since the fastening nut itself can be used in common as the cap member fitted to the insertion-molding hole of the fastening nut of the connector housing for improvement of the water-tightness. It is possible to eliminate the water-proof or dust-proof cap member, thus reducing the number of the parts and thereby the cost of the fastening nut, while improving the assembly workability in the mass production line.

DETAILED DESCRIPTION OF THE EMBODIMENTS

Figure 1:
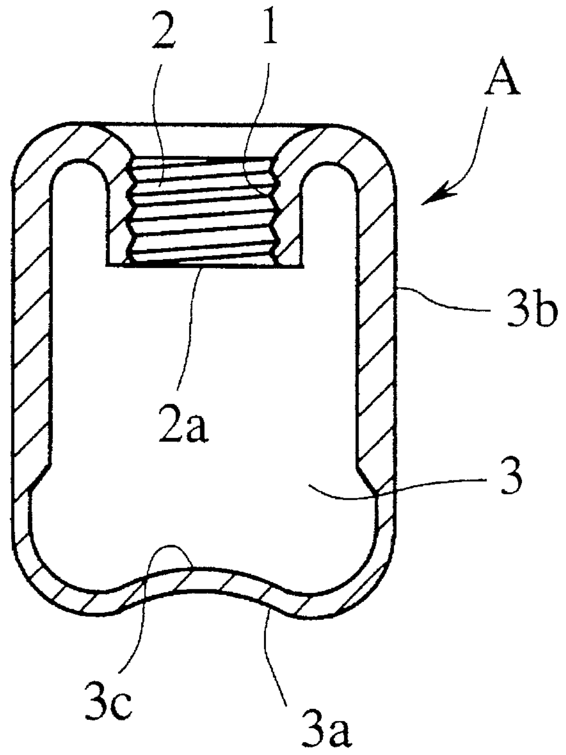
FIG. 1 is a longitudinal cross-sectional view showing an a first embodiment of the connector fastening nut according to the present invention.
Figure 2:
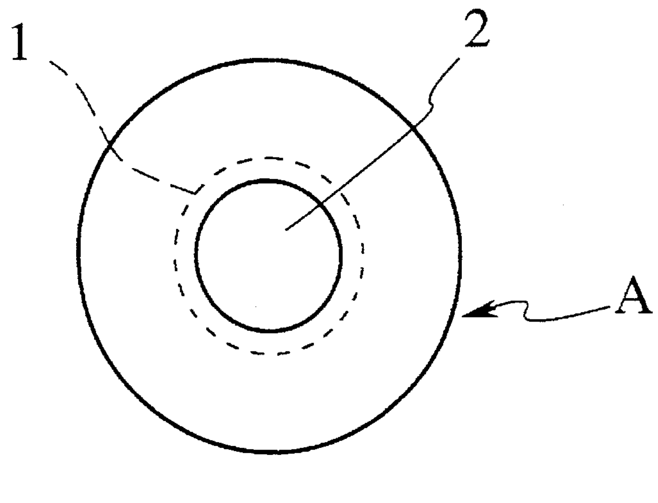
FIG. 2 is a plane view showing the same connector fastening nut shown in FIG. 1.

FIG. 1 is a cross-sectional view showing a first embodiment of the connector fastening nut A according to the present invention, and FIG. 2 is a plane view showing the same.

Figure 3:
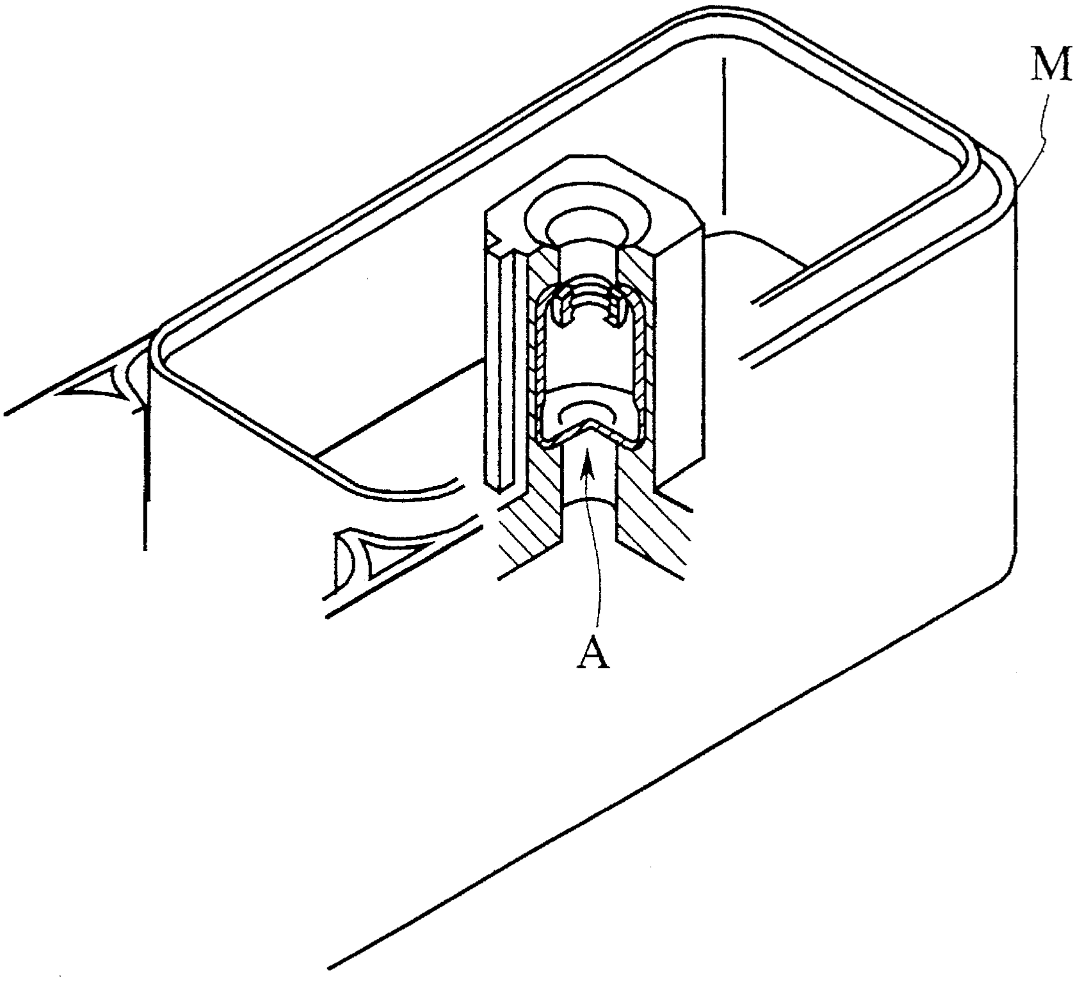
FIG. 3 is a perspective view showing the connector fastening nut (shown in FIG. 1) attached to one of two connector housings of a bolt-nut fastened connector.

As shown in FIG. 3, the connector fastening nut A is mounted or insertion-molded together with one of two mated bolt-nut fastened connector housings. This fastening nut A is engaged with a connector fastening bolt fitted to the other of the two malted bolt-nut fastened connector housings, to fasten the two connector housings.

Figure 4:
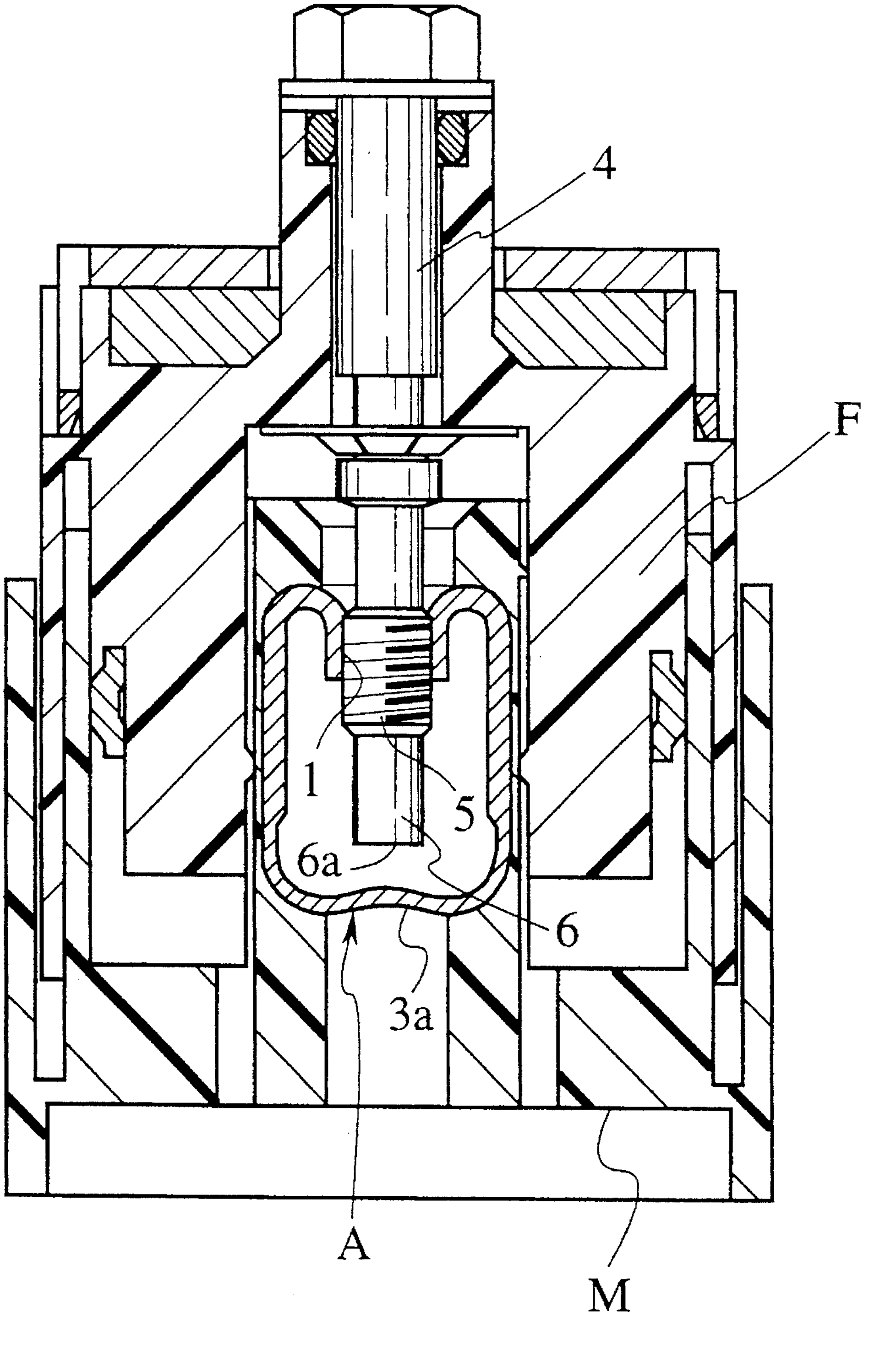
FIG. 4 is a cross-sectional view showing the state where the bolt-nut fastened connector having the connector fastening nut according to the present invention is being fastened by use of a fastening bolt.

In FIG. 1, the fastening nut A made of a metal such as braze is formed into a cylindrical box-shaped nut, which is formed with of an upper opening 2*a*, a relatively thick-walled side wall 3*b*, and a relatively thin-walled bottom wall 3*a* so as to form a bolt accommodating chamber 3 therewithin. The upper opening 2*a* has a threaded hole 2 formed with a female threaded portion 1. In FIG. 4, on the other hand, the fastening bolt 4 is formed with a male threaded portion 5 and a cylindrical portion 6 having a contact end 6*a*. Therefore, the female threaded portion 1 of the nut A is engaged with a male thread portion 5 of the fastening bolt 4 (as shown in FIG. 4).

In FIG. 1, the bottom wall 3*a* of the bolt accommodating chamber 3 is formed with an inward projecting (or expanding) elastic portion 3*c* for urging the fastening bolt 4 upward (in the vertical direction in FIG. 1) when the male threaded portion 5 of the fastening bolt 4 has passed through the female threaded portion 2 of the fastening nut A; that is, after the two connector housings have been full engaged without applying an excessive fastening force to the two connector housings.

In use of the fastening nut A and the fastening bolt 4, as shown in FIG. 4, the fastening nut A is mounted in a first connector housing M, and the fastening bolt 4 is rotatably fitted into a second connector housing F. After that, the two connector housing M and F are connected to each other by engaging the male threaded portion 5 of the fastening bolt 4 with the female thread portion 1 of the fastening nut A.

Figure 5:
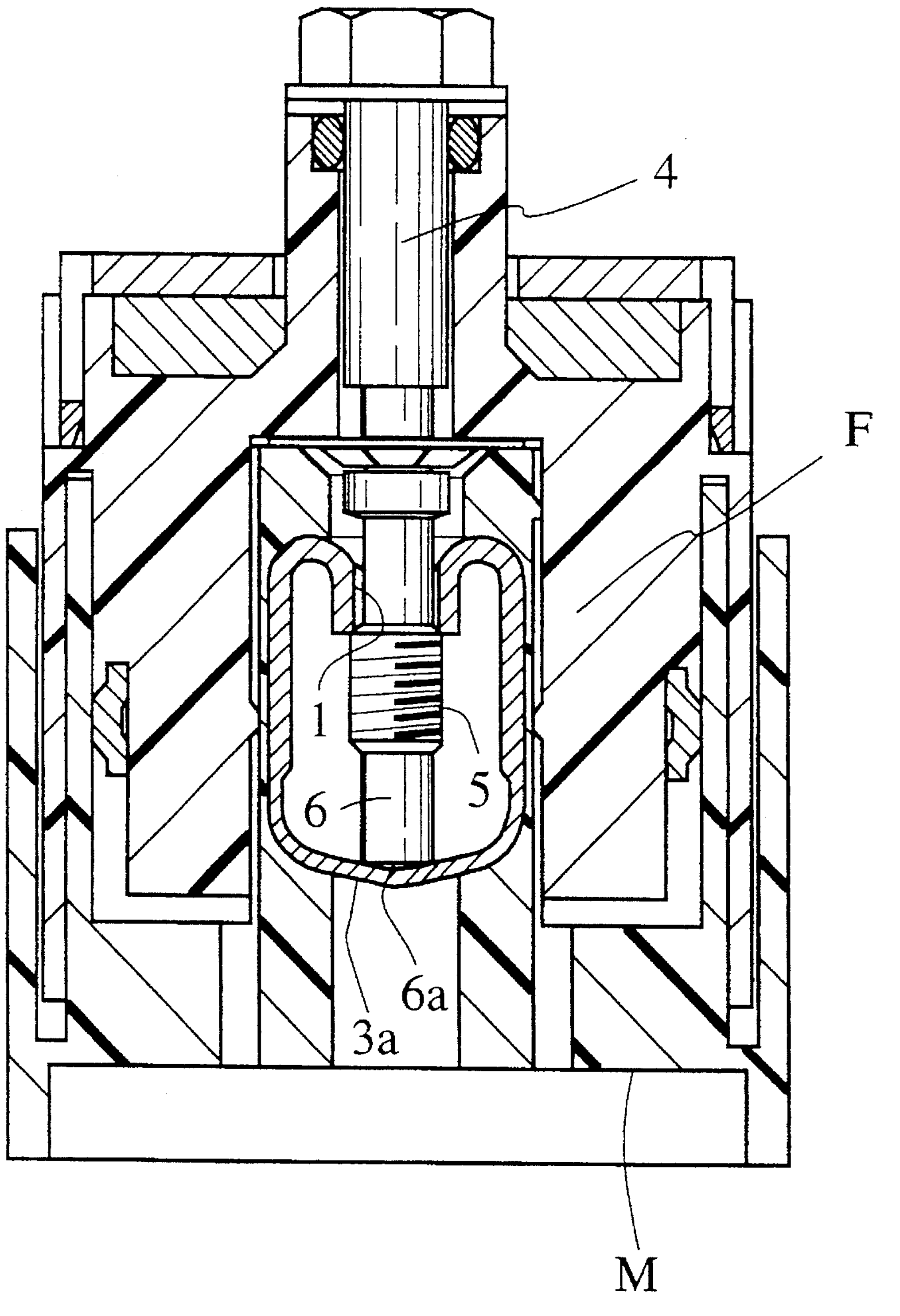
FIG. 5 Is a cross-sectional view showing the state where the bolt-nut fastened connector having the connector fastening nut according to the present invention has been full fastened to the other connector housing by use of a fastening bolt, so that the bottom wall of the fastening nut is pushed outward by an end of the fastening, so that the fastening bolt is urged upward into engagement of the two mated thread portions of the fastening bolt and nut.

When the two mated connector housings M and F are full connected, since the male threaded portion 5 of the fastening bolt 4 is disengaged away from the female threaded portion 1 of the fastening nut A, the end 6*a* of the cylindrical portion 6 of the fastening bolt 4 is brought into contact with the bottom wall 3*a* of the fastening nut A and further deforms outward (downward in FIG. 1) the inward projecting elastic bolt urging portion 3*c*, of the bottom wall 3*a* of the bolt accommodating chamber 3 of the fastening nut A, as shown in FIG. 5.

As a result, when the fastening bolt 4 is full inserted into the fastening box nut A and therefore the two mated connector housings M and F are both full connected, the fastening bolt 4 is urged outward (upward) by an elastic force of the bottom wall 3*a* of the bolt accommodating chamber 3 of the fastening nut A, so that the male threaded portion 5 of the fastening bolt 4 is urged into engagement with the female thread portion 1 of the nut A. According, when the fastening bolt 4 is rotated in the reverse direction to disengage the two mated connector housings M and F, since the male threaded portion 5 of the fastening bolt 4 has been already engaged with the female threaded portion 1 of the nut A, it is possible to immediately disengage the two connector housings M and F from each other.

Although being different according to the size of the bolt accommodating chamber 3, it is preferable that the length of the cylindrical portion 6 of the fastening bolt 4 is determined in such a way that the end 6*a* of the fastening bolt 4 is brought into contact with the inward projecting elastic bolt urging portion 3*c* of the bottom portion 3*a* of the bolt accommodating chamber 3 of the nut A, immediately before the male threaded portion 5 of the fastening bolt 4 is disengaged away from the female threaded portion 1 of the nut A.

In the first embodiment as described above, although the bottom surface 3*a* of the bolt accommodating chamber 3 is formed into a thin wailed portion extending from the relatively thick-walled side wall 3*b* integral with each other (so that an elastic force can be easily obtained), it is possible to form the fastening nut A by the same thickness metal (without changing the thickness of the walls). In this case, it is preferable to increase the elasticity of only the bottom portion 3*a* by heat treatment, for instance.

Figure 6:
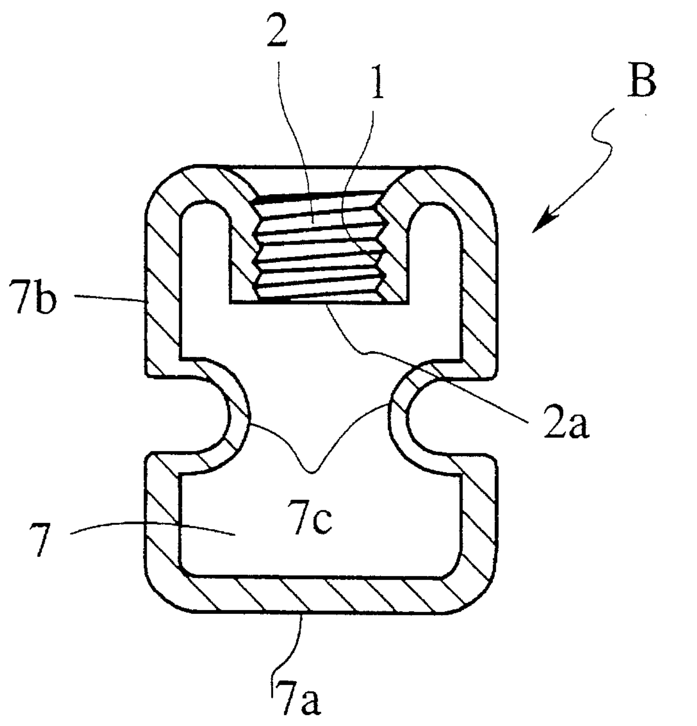
FIG. 6 is a longitudinal cross-sectional view showing an a second embodiment of the connector fastening nut according to the present invention.

FIG. 6 shows a second embodiment of the connector fastening nut B according to the present invention, in which the nut B is formed with of an upper opening 2*a*, a relatively thick-walled side wall 7*b*, and a relatively thick-walled bottom wall 7*a* so as to form a bolt accommodating chamber 7 therewithin. The upper opening 2*a* has a threaded hole 2 formed with a female threaded portion 1. This second embodiment B is different from the first embodiment A in that the side wall 7*b* is formed with an annular relatively thin-walled inward projecting elastic bolt urging portion 7*c* in the bolt accommodating chamber 7, to urge a fastening bolt 4 upward after the male thread portion 5 of the fastening bolt 4 has passed through the female threaded portion 1 of the fastening nut A. Further, although not shown, it is also possible to from an annular relatively thin-walled outward projecting elastic portion of the bolt accommodating chamber 7.

When the two mated connector housings M and F are full connected, since the male threaded portion 5 of the fastening bolt 4 is disengaged away from the female threaded portion 1 of the fastening nut B, the end 6*a* of the cylindrical portion 6 of the fastening bolt 4 is brought into contact with the bottom wall 7*a* of the fastening nut B and further deforms vertically downward the inward projecting elastic bolt urging portion 7*c* of the side wall 7*b* of the bolt accommodating chamber 7 of the fastening nut B.

As a result, when the male threaded portion 5 of the fastening bolt 4 has been passed through the female threaded portion 1 of the fastening box nut A and therefore the two mated connector housings M and F are both full connected, the fastening bolt 4 is urged outward (upward) by an elastic force of the side wall 7*a* of the bole accommodating chamber 7 of the fastening nut B, so that the male threaded portion 5 of the fastening bolt 4 is urged into engagement with the female thread portion 1 of the nut A. Further, in this embodiment, since the bolt accommodating chamber 7 is extended or compressed, it is necessary to provide a deformed nut accommodating space by forming the nut accommodating hole of a relatively large diameter in the connector housing, so that the formed space can absorb the extension and compression (deformation) of the fastening nut B.

Figure 7:
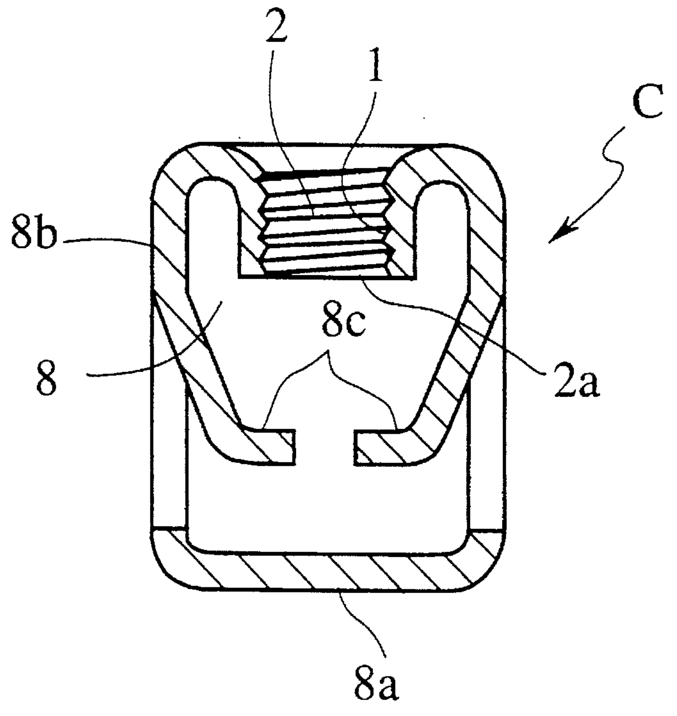
FIG. 7 is a longitudinal cross-sectional view showing an a third embodiment of the connector fastening nut according to the present invention.

FIG. 7 shows a third embodiment of the connector fastening nut C according to the present invention, in which the nut C is formed with of an upper opening 2*a*, a side wall 8*b*, and a bottom wall 8*a* so as to form a bolt accommodating chamber 8 therewith. The upper opening 2*a* has a threaded hole 2 formed with a female threaded portion 1. This third embodiment C is different from the first embodiment A in that the side wall 8*b* is cut off inward at least two positions so as to form hook-shaped elastic bolt urging portions 8*c* for urging the fastening bolt 4, after the male threaded portion 5 of the fastening bolt 4 has passed through the female threaded portion 1 of the fastening nut A.

When the two mated connector housings M and F are full. Connected, since the male threaded portion 5 of the fastening bolt 4 is disengaged away from the female threaded portion 1 of the fastening nut C, the end 6*a* of the cylindrical portion 6 of the fastening bolt 4 is brought into contact with the hook-shaped elastic bolt urging portions 8*c* of the fastening nut C and further deforms vertically (downward) the elastic bolt urging portions 8*c* extending from the two side walls 8*b* of the fastening nut B.

As a result, when the fastening bolt 4 has been passed through the fastening box nut C and therefore the two mated connector housings M and F are both full connected, the fastening bolt 4 is urged outward (upward) by an elastic force of the elastic bolt urging portion 8*c* of the fastening nut C, so that the male threaded portion 5 of the fastening bolt 4 is urged into engagement with the female thread portion 1 of the nut C.

In the above-mentioned three embodiments, although the fastening nut is formed into a box-shaped nut having a bolt accommodating chamber therewithin under the female threaded hole, the fastening nut according to the present invention is not limited to only the above-mentioned embodiments, as far as the fastening bolt is urged upward after the male threaded portion of the fastening bolt has passed through the female threaded portion of the fastening nut; that is, when the two mated connector housings have been full engaged.

Figure 8:
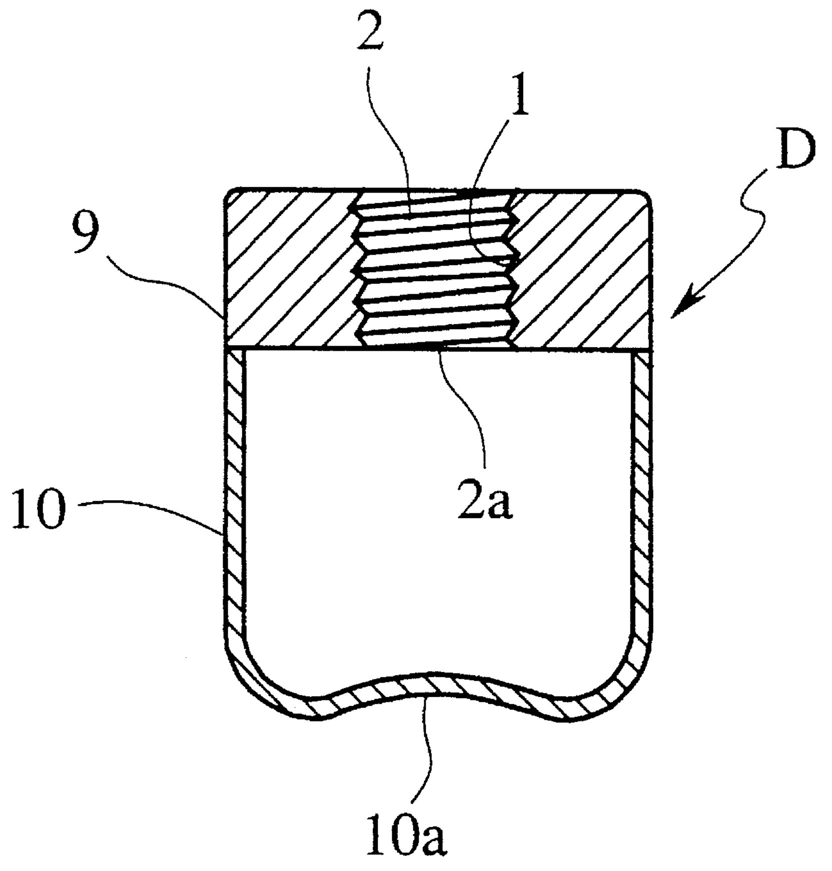
FIG. 8 is a longitudinal cross-sectional view showing an a fourth embodiment of the connector fastening nut according to the present invention.

For instance, FIG. 8 shows a fourth embodiment, in which the nut D has an annular plate member 9 formed with of an upper opening 2*a* having a threaded hole 2 formed with a female threaded portion 1 and further a U-shaped elastic member 10 fixed to the outer circumference of the annular plate member 9 at two opposing sides by welding, for instance. Further, the elastic member 10 is formed with an inward projecting elastic bolt urging portion 10*a* at roughly the central portion thereof, in the same way as with the case of the first embodiment of the nut A.

The elastic bolt urging member 10 is made of an elastic member such as steel or brass plate or a plurality of piano wires arranged or twisted. In other words, as far as the fastening bolt can be urged upward when brought into contact with the elastic member of the fastening nut, it is possible to adopt any shapes or an any materials as the fastening bolt urging means or the elastic portion.

As described above, in the connector fastening nut according to the present invention, since the fastening nut is provided with the elastic portion or member for urging the male threaded portion of the fastening bolt into engagement of the female threaded portion of the fastening nut, it is possible to immediately disengage the two engaged connector housings from each other, without applying an excessive bolt urging force to the female threaded portion of the fastening nut and without another additional bolt urging parts or element. In other words, since the fastening bolt can be urged by the fastening nut itself, it is possible to reduce the number of the parts and thereby the cost of the fastening nut, while improving the assembly workability in the mass production line.

Further, since the box-shaped fastening nut is used, the nut hole formed in the connector housing can be sealed water-tightly when the connector fastening nut according to the present invention is insertion-molded together with the connector housing. In other words, since the fastening nut itself can be used in common as the cap member fitted to the insertion-molding hole of the fastening nut of the connector housing for improvement of the water-tightness. It is possible to eliminate the water-proof or dust-proof cap member, thus reducing the number of the parts and thereby the cost of the fastening nut, while improving the assembly workability in the mass production line.

What is claimed is:

1. A connector fastening nut for a bolt-nut fastened connector, comprising:

a nut member fixed to a first connector housing and having a female threaded portion engaged with a male threaded portion of a fastening bolt fitted to a second connector housing; and an elastic portion integral with said nut member, for urging an end of the fastening bolt in an engagement direction between the female threaded portion of said nut member and the male threaded portion of the fastening bolt, when the male threaded portion has been passed through the female threaded portion after full engagement of the two connector housings by fastening the fastening bolt to the fastening nut, wherein said nut member is a box-shaped nut; and said elastic portion is in a side wall portion of the box-shaped nut integral with the female threaded portion of said nut member.

2. The connector fastening nut of claim 1, wherein the side wall portion is bent inwardly in the side wall portion of said box-shaped nut to provide an inward projecting elastic portion.

3. The connector fastening nut of claim 1, wherein wall thickness of the side surface portion is thin, as compared with other wall portions of the box-shaped nut.

4. A connector fastening nut for a bolt-nut fastened connector, comprising:

a nut member fixed to a first connector housing and having a female threaded portion engaged with a male threaded portion of a fastening bolt fitted to a second connector housing; and an elastic portion integral with said nut member, for urging an end of the fastening bolt in an engagement direction between the female threaded portion of said nut member and the male threaded portion of the fastening bolt, when the male threaded portion has been passed through the female threaded portion after full engagement of the two connector housings by fastening the fastening bolt to the fastening nut, wherein said nut member is a box-shaped nut; and said elastic portion is at least one hooked-shaped cut-out elastic portions in a side wall of the box-shaped nut integral with the female threaded portion of said nut member.

5. A connector fastening nut for a bolt-nut fastened connector, comprising:

a nut member fixed to a first connector housing and having a female threaded portion engaged with male threaded portion of a fastening bolt fitted to a second connector housing; and an elastic portion integral with said nut member, for urging an end of the fastening bolt in an engagement direction between the female threaded portion of said nut member and the male threaded portion of the fastening bolt, when the male threaded portion has been passed through the female threaded portion after full engagement of the two connector housings by fastening the fastening bolt to the fastening nut wherein said nut member is an annular plate member; and said elastic portion is a U-shaped bolt urging member fixed to an outer circumference of the annular plate member at two opposing sides thereof by welding.

6. The connector fastening nut of claim 5, wherein the bottom portion of said U-shaped bolt urging portion is bent inwardly in the bottom portion thereof to provide an inward projecting elastic portion.

* * * * *